United States Patent
McKeon et al.

(10) Patent No.: US 10,364,645 B2
(45) Date of Patent: Jul. 30, 2019

(54) FLOW CONTROL SYSTEM WITH INTERCHANGEABLE ACTUATORS

(75) Inventors: Michael Anthony McKeon, Longford (IE); Declan Elliott, Longford (IE); Finbarr Williams Evans, Longford (IE)

(73) Assignee: Cameron International Corporation, Houston, TX (US)

( * ) Notice: Subject to any disclaimer, the term of this patent is extended or adjusted under 35 U.S.C. 154(b) by 1179 days.

(21) Appl. No.: 13/555,012

(22) Filed: Jul. 20, 2012

(65) Prior Publication Data

US 2014/0020909 A1    Jan. 23, 2014

(51) Int. Cl.
| | |
|---|---|
| E21B 34/02 | (2006.01) |
| E21B 41/00 | (2006.01) |
| F16K 31/50 | (2006.01) |
| F16K 43/00 | (2006.01) |
| F16K 31/05 | (2006.01) |

(52) U.S. Cl.
CPC ............. *E21B 34/02* (2013.01); *E21B 41/00* (2013.01); *F16K 31/05* (2013.01); *F16K 31/50* (2013.01); *F16K 43/00* (2013.01)

(58) Field of Classification Search
CPC .................................. E21B 34/02; E21B 34/04
USPC ......... 166/379, 386, 373, 332.1, 332.2, 368; 137/315.2, 269; 251/297, 292
See application file for complete search history.

(56) References Cited

U.S. PATENT DOCUMENTS

| | | | |
|---|---|---|---|
| 4,230,299 A | 10/1980 | Pierce, Jr. | |
| 4,471,810 A | 9/1984 | Muchow et al. | |
| 5,240,030 A * | 8/1993 | Wang | ............................. 137/269 |
| 6,659,419 B2 * | 12/2003 | Chatufale | ........................ 251/14 |
| 6,883,614 B2 * | 4/2005 | Schmidt | ................... F16K 39/04 |
| | | | 166/373 |
| 7,025,140 B2 * | 4/2006 | McGee | .......................... 166/267 |
| 2004/0216888 A1 | 11/2004 | Schmidt et al. | |

OTHER PUBLICATIONS

International Search Report and Written Opinion for PCT Application No. PCT/US2013/040197 dated Apr. 7, 2014; 10 pgs.

* cited by examiner

*Primary Examiner* — Anna M Momper
*Assistant Examiner* — Patrick F Lambe

(57) ABSTRACT

A system, including a wellhead system, and a flow control system coupled to the wellhead system, wherein the flow control system comprises, a flow control device including a housing, a flow path through the housing from an inlet to an outlet, and a flow control element disposed in the housing along the flow path, and an actuator mounting assembly coupled to the flow control device, wherein the actuator mounting assembly is configured to selectively mount one of a manual actuator and a powered actuator to actuate the flow control element of the flow control device, without taking the flow control system offline.

20 Claims, 5 Drawing Sheets

FLOW CONTROL SYSTEM WITH INTERCHANGEABLE ACTUATORS

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Wellhead systems use flow control devices (e.g., valves, chokes, etc.) to control fluid (e.g., oil or gas) flow in mineral extraction operations. Specifically, flow control devices may control pressure and fluid flow into pipes, which then move the minerals to processing plants or other locations. An actuator may control the flow control devices to increase, or decrease, pressure and flow. The actuator may be manual or powered. Unfortunately, changing actuator type requires taking the flow control device offline (e.g., no flow) to change actuator mounting components. This offline swap is disadvantageous for many reasons, including lost production time.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments include a flow control system capable of changing actuators in a wellhead system. Specifically, the flow control system may interchange between a manual actuator and a powered actuator without stopping mineral extraction operations. For example, in the beginning phases of mineral extraction operations, the actuator in the flow control system may be a manual actuator. In a different phase, it may be desirable to transition to a powered actuator. Advantageously, the disclosed embodiments illustrate a flow control system that can change actuator types without stopping the mineral extraction operations.

Figure 1:
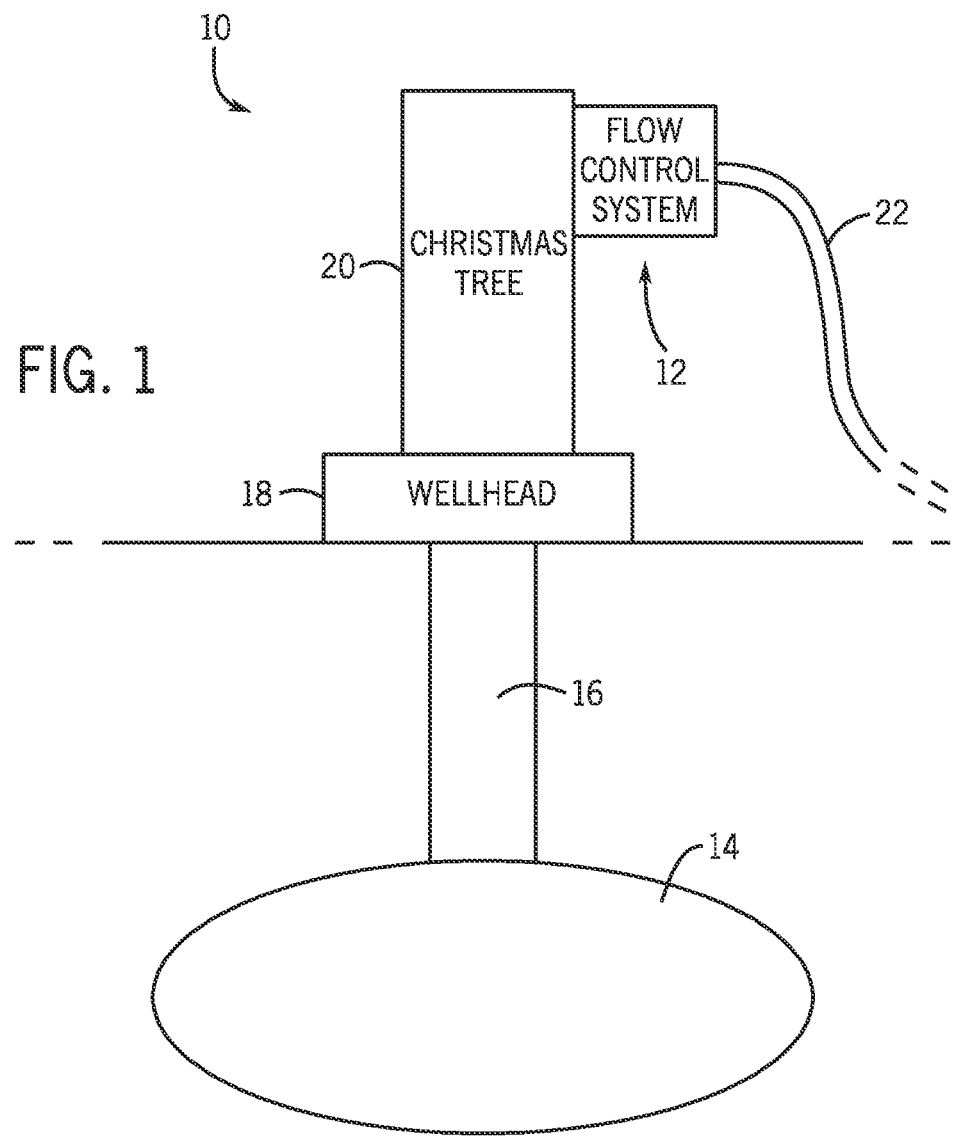
FIG. 1 is a schematic diagram of a wellhead system with a flow control system.

FIG. 1 is a schematic diagram of a wellhead system 10 with a flow control system 12. The wellhead system 10 may extract oil, natural gas, and other natural resources from a natural resource reservoir 14 through a well 16. The mineral extraction system 10 includes the flow control system 12, wellhead 18, Christmas tree 20, and transportation pipe 22. In operation, the wellhead system 10 moves natural resources from the reservoir 14 through the well 16. As the minerals pass through the wellhead 18 and into the Christmas tree 20 they are under great pressure. For example, the minerals may be under pressures around 10,000 PSI. And the pipe 22 or a downstream processing plant may not be designed to accommodate such pressures. Accordingly, the wellhead system 10 includes the flow control system 12, which reduces flow and pressure to manageable levels. For example, the flow control system 12 may reduce the fluid pressure from 10,000 PSI in the Christmas tree to 1500 PSI in the pipe 22. The flow control system 12 may also change the volume of fluid that enters the pipe 22. This assists downstream processes to maintain pace with the amount of natural resources flowing out of the wellhead system 10.

The flow control system 12 may operate with a manual or powered actuator. For example, an operator may use a manual actuator during initial phases of mineral extraction operations. In later phases (e.g., steady state), it may be desirable to replace the manual actuator with a powered actuator, such as an electric drive, a hydraulic drive, or any other power-assisted drive. The flow control system 12 may also have a controller located away from the wellhead to control the powered actuator based on feedback. This may enable the system 10 to run without the constant supervision of an operator. Advantageously, the actuators for flow control system 12 may be changed without stopping the flow of minerals. This capability can save time and money by preventing costly shutdowns of the wellhead system 10, for instance.

Figure 2:
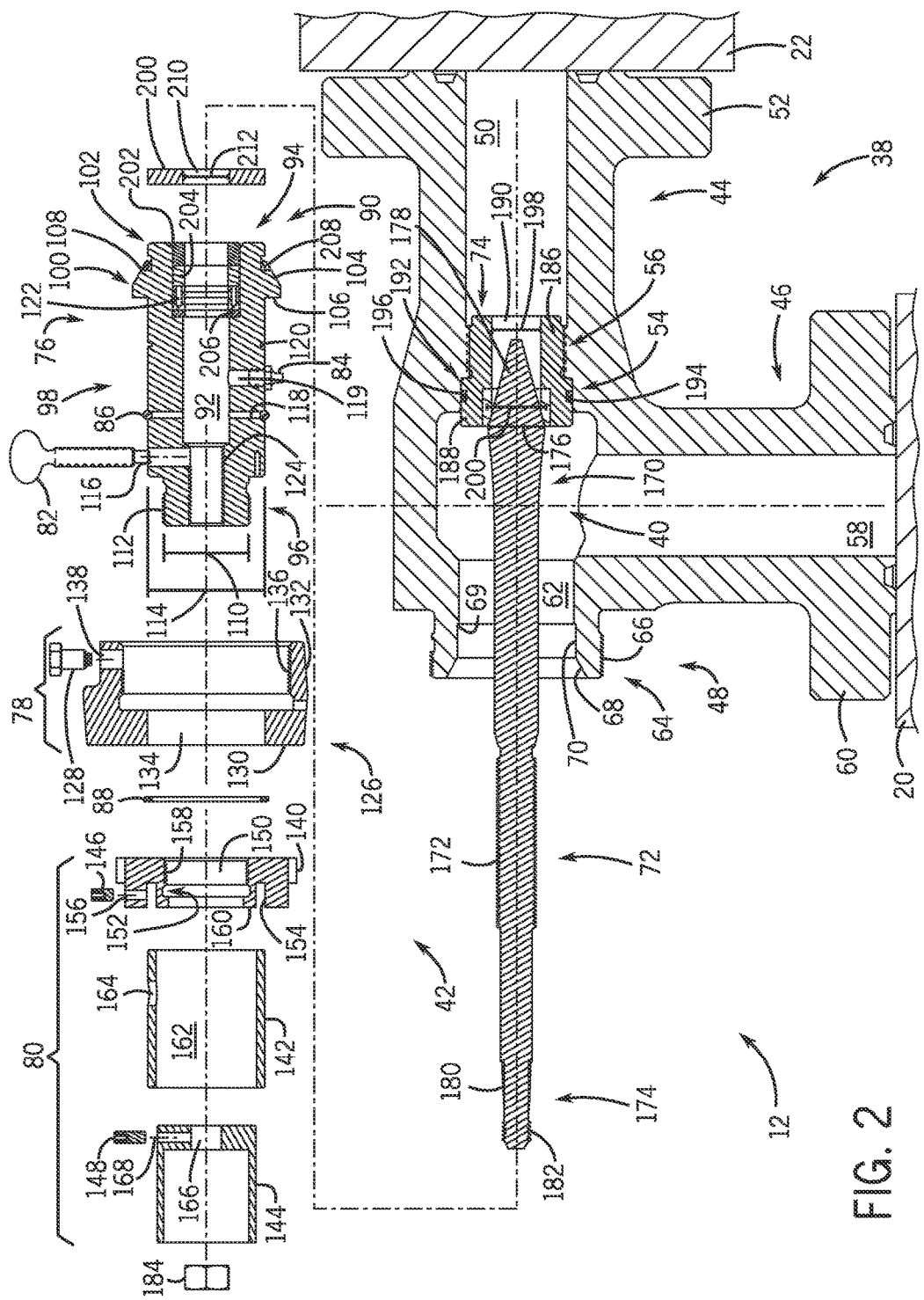
FIG. 2 is a partially exploded cross-sectional view of a flow control system without an actuator.

FIG. 2 is a partially exploded cross-sectional view of a flow control system 12, such as a choke, without an actuator. The flow control system 12 includes a choke body 38 (housing), a flow control device 40, and an actuator mounting assembly 42. The choke body 38 defines a first portion 44, a second portion 46, and a third portion 48. The choke body 38 may be in line or connects to the Christmas tree 20, the pipe 22, and the mounting assembly 42 with respective first portion 44 (outlet), second portion 46 (inlet), and third portion 48. Specifically, the first portion 44 defines an aperture 50, flange 52, counter bore 54, and threaded surface 56. The first portion 44 connects to the pipe 22 with flange 52. The second portion 46 likewise defines an aperture 58 and a flange 60. The flange 60 connects the second portion 46 to the Christmas tree 20. The third portion 48 defines an aperture 62 and flange 64. The flange 64 includes a threaded outer surface 66, angled contact surface 68 (e.g., tapered annular surface), counter bore 69, and inner aperture surface 70. As illustrated, the flow control device 40 has a needle valve with a flow control element 72 (e.g., needle) and a seat 74. The seat 74 connects to the choke body 38 within the aperture 50, with the needle 72 interacting with the seat 74 through aperture 62. In other embodiments, the flow control device 40 may be another kind of valve (e.g., butterfly valve, plug and cage valve, external sleeve valve, multistage trim valve, valve, gate valve). The mounting assembly 42 connects to the choke body 38 using the aperture 62 and flange 64. The three apertures 50, 58, and 62 are in fluid communication so that oil/gas entering the Christmas tree 20 passes through the flow control device 40 and into the pipe 22 for shipment, refining, or another process.

The actuator mounting assembly 42 may include a bonnet 76, a bonnet nut assembly 78, an actuator retention assembly or indicator guide assembly 80, a shaft retainer or locking device 82 (e.g., a locking thumb screw), a grease fitting 84, an o-ring 86, a retainer ring 88, and a seal assembly 90. Advantageously, the mounting assembly 42 enables the connection of a manual or powered actuator.

The bonnet 76 defines a shaft bore or aperture 92, and has a first end portion 94 (e.g., choke body connection portion), a second end portion 96 (e.g., guide assembly connection portion), and a body portion 98. The choke body connection portion 94 includes a flange 100 (e.g., bonnet interface) and retention portion 102. The flange 100 defines an angled choke body contact surface 104 (e.g., tapered annular surface) and a perpendicular bonnet nut contact surface 106. The angled contact surface 104 may include a gasket groove 108.

The guide assembly portion 96 of the bonnet 76 defines a diameter 110 with a threaded surface 112 to enable connection with the indicator guide assembly 80. The body portion 98 defines a diameter 114, a port or locking aperture 116 crosswise to the shaft bore 92, a vent aperture 118 crosswise to the shaft bore 92, and a retainer ring groove 120. As illustrated the diameter 114 of body portion 98 is greater than the diameter 112 of the guide assembly portion 96. As discussed above, the bonnet 76 includes the aperture 92. The aperture 92 further defines a counter bore 122, and threaded surface 124.

The bonnet nut assembly 78 connects and holds the bonnet 76 to the choke body 38. The assembly 78 includes a bonnet nut 126 (e.g., retainer or retainer nut) and a bonnet locking nut 128. The bonnet nut 126 includes a bonnet retention portion 130 and a choke body connection portion 132. The illustrated bonnet retention portion 130 defines an aperture 134 equal to or greater than the diameter 114 of the bonnet body portion 98 but less than the diameter 114 with the flange 100. This allows the bonnet nut 126 to slide over the bonnet 76 until the bonnet retention portion 130 contacts the nut contact surface 106 of the flange 100. The choke body connection portion 132 includes a threaded contact surface 136 and aperture 138. The threaded contact surface 136 enables the bonnet nut 126 to thread onto threaded surface 66 of the flange 64.

When connecting the bonnet 76 to the choke body 38, the bonnet connection portion 94 slides into the aperture 62 until the angled contact surface 104 of the flange 100 contacts the angled surface 68 of the flange 64. In order to secure the bonnet 76 to the choke body 38, the bonnet nut 126 slides over the bonnet 76 until the threaded contact surface 136 contacts the threaded surface 66 of the flange 64. Bonnet nut 126 then threads the threaded contact surface 136 onto the threaded surface 66 until the bonnet retention portion 130 contacts the nut contact surface 106. In this manner, the angled surface 104 of the bonnet 76 compresses against the angled surface 68 of the flange 64. The locking bonnet nut 128 then threads into the aperture 138 and into the threaded surface 66 of flange 64. As a result, the locking bonnet nut 128 blocks rotation and loosening of the bonnet nut 126.

As discussed above, the body portion 98 includes locking aperture 116 (e.g., port), vent aperture 118, grease fitting aperture 119, and retainer ring groove 120. The locking aperture 116 receives a locking thumb screw 82 that may block movement of the needle 72. The vent aperture 118 receives an o-ring 86. The grease fitting aperture 119 receives a grease fitting 84. It is the grease fitting aperture 119 that allows grease to enter the bonnet aperture 92 through grease fitting 84. This provides lubrication for the needle 72 as it rotates within the bonnet 76. If excess grease and pressure builds within the bonnet aperture 92, then the grease escapes through the vent aperture 118 and past the o-ring 86. The retainer ring groove 120 receives the retainer ring 88. The retainer ring 88 follows the attachment of the bonnet nut 126 and slides into the retainer ring groove 120. The retainer ring 88 blocks unintentional removal of the bonnet nut 126 after attachment to the choke body 38.

The guide assembly portion 96 of the bonnet 76 defines a diameter 110 with a threaded surface 112 for connection to the position indicator guide assembly 80. The indicator guide assembly 80 includes a guide nut 140 (e.g., retainer or retainer nut), guide sleeve 142, guide 144, sleeve nut 146, and needle connection nut 148. The guide nut 140 defines an aperture 150, a counter bore 152, a sleeve slot 154, and sleeve nut aperture 156. The aperture 150 allows the needle 72 to pass through the guide nut 140 and into the bonnet 76. The counter bore 152 includes a threaded surface 158 and guide contact surface 160. The guide nut 140 connects to the threaded surface 112 of the bonnet 76 with the threaded surface 158. The sleeve slot 154 receives the guide sleeve 142, and is held in place with the sleeve nut 146 (e.g., grub screw) that passes through the sleeve nut aperture 156. The guide sleeve 142 includes a guide aperture 162 and an aperture 164. The aperture 162 allows the needle 72 to pass through sleeve 142 and receives the guide 144. The guide 144 passes through the guide sleeve 142 until contacting the guide contact surface 160 of the guide nut 140. The guide 144 includes an aperture 166 and a needle connection nut aperture 168. The aperture 166 allows the needle 72 to pass through guide 144. The needle connection nut 148 then securely connects the guide 144 to the needle 72 through the aperture 168. The secure connection of the guide 144 to the needle 72 allows the guide to show changing position of the needle 72 in the flow control system 12.

As explained above, the flow control device 40 is a needle valve that includes the needle 72 and seat 74. In other embodiments, the flow control device may be a butterfly valve, plug and cage valve, external sleeve valve, multistage trim valve, valve, or gate valve. The needle 72 includes a first portion 170, a second threaded portion 172 (e.g., threaded shaft), a third portion 174. The first portion 170 defines a diameter 176 that progressively decreases in diameter to create a needle tip 178. The needle tip 178 interacts with the seat 74 to increase and decrease flow and pressure of minerals moving through the flow control system 12. The second threaded portion 172 provides for threaded engagement with the threaded portion 124 of the bonnet 76. This allows the needle 72 to move further in or out of the choke body 38 changing its interaction with the seat 74 (e.g., changing flow and pressure from Christmas tree 20 into the pipe 22). The third portion 174 includes an actuator contact section 180 and a threaded section 182. The actuators (e.g., manual or powered actuators) connect to the needle 72 at the actuator contact section 180, and are held in place with the nut 184.

The needle 72, seat 74, and seal assembly 90 operate together to create fluid tight seals in the choke body 38. As illustrated, the seat 74 includes a threaded first portion 186, a stepped second portion 188, an aperture 190, and a counter bore 192. The stepped second portion 188 may include a seal groove 194 and a seal 196. The seat 74 connects to and creates a fluid tight seal in the choke body 38 by threading the first portion 186 into the threaded surface 56 until the stepped portion 188 contacts the counter bore 54 of the aperture 50. This engagement forces the seal 196 into contact with the first portion 44 creating a fluid tight seal. The aperture 190 and the counter bore 192 define a respective diameter 198 and diameter 200. The diameter 198 is smaller than both the diameter 200 of the counter bore 192 and the diameter 176 of the needle first portion 170. Accordingly, the needle tip 178 (e.g., cone portion) creates sealing contact with the counter bore 192 as the needle tip 178 enters the aperture 190. Thus, the needle tip 178 increases or decreases the amount of space it occupies in the aperture 190 as it moves further in and further out of the seat 74. The change in space increases or decreases the pressure and flow rates of minerals coming from the Christmas tree 20 and entering the pipe 22.

The seal assembly 90 blocks the minerals from exiting the aperture 62 in the third portion of the choke body 38 as they flow past the seat 74. The seal assembly 90 includes seal retainer 200 and seals 202, 204, 206, and 208. The seal retainer 200 rests in the counter bore 69 of the third portion 48. The seal retainer 200 includes an aperture 210 with a diameter 212. The diameter 212 may be equal to or greater than the diameter 176 of the needle 72, but less than the counter bore 122 of the bonnet 76. The diameter 212 enables the seal retainer 200 to keep seals 202, 204, and 206 within the counter bore 122 of the bonnet 76. The seals 202, 204, and 206 provide sealing engagement between the needle 72 and the bonnet 76. The seal or gasket 208 rests in the gasket groove 108, and provides sealing engagement between the bonnet 76 and the third portion 48 of the choke body 38. Accordingly, these seals 202, 204, 206, and 208 block minerals from exiting the system either between the bonnet 76 and the needle 72; or the bonnet 76 and the choke body 38.

Figure 3:
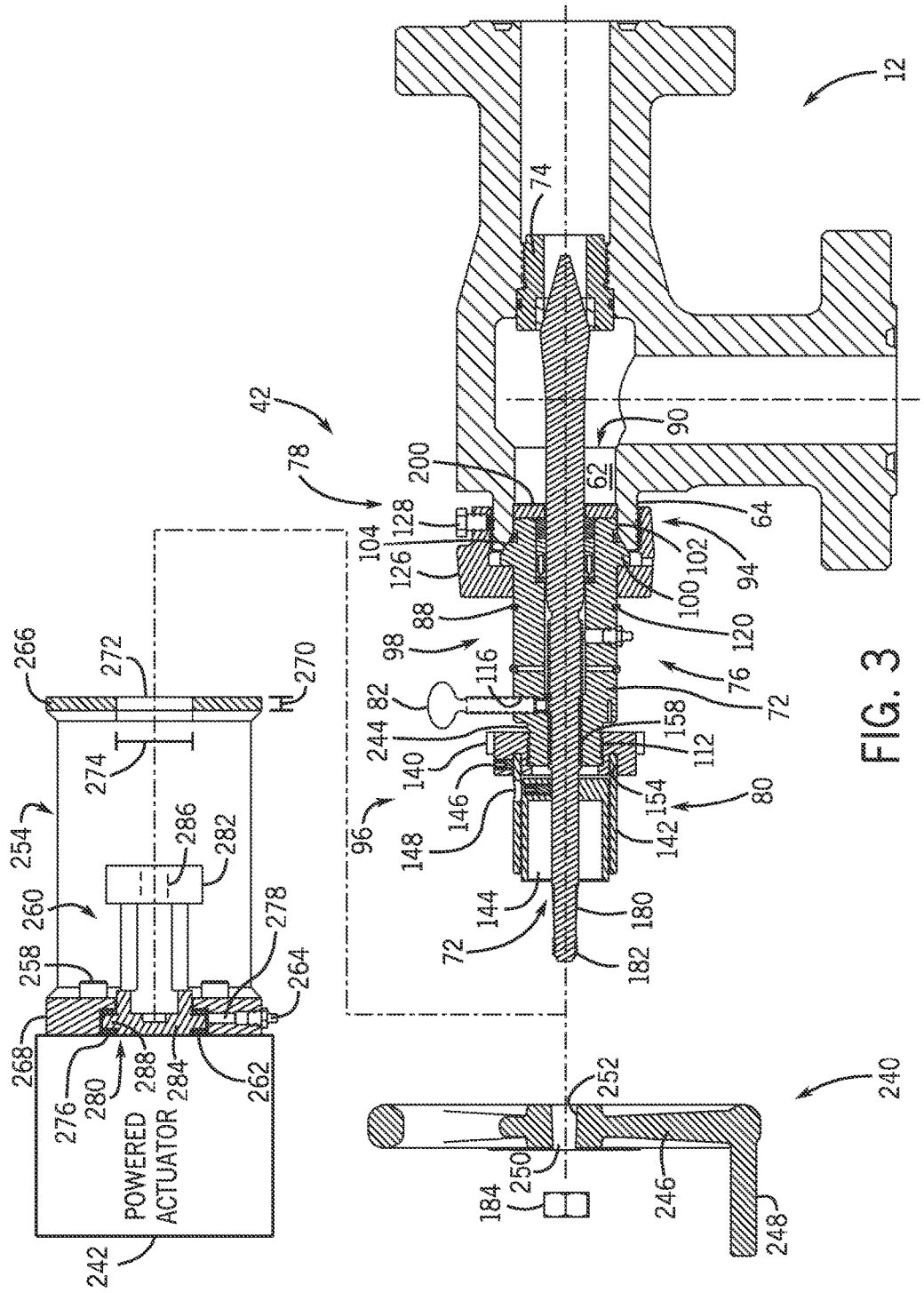
FIG. 3 is a cross-sectional view of a flow control system capable of receiving either a manual or powered actuator.

FIG. 3 is a cross-sectional view of the mounting assembly 42 assembled and capable of receiving either a manual actuator 240 or powered actuator 242 (e.g., electric drive, hydraulic drive, etc.). As illustrated, the seal retainer 200 rests in the aperture 62 and retains the seals 202, 204, and 206. The bonnet 76 connects to the choke body 38 with the bonnet connection portion 94 inserted into the aperture 62 until the angled contact surface 104 of the flange 100 contacts the angled surface 68 of the flange 64. The bonnet nut 126 secures the bonnet 76 to the choke body 38 by threading onto the flange 64 and is then locked in place with the locking bonnet nut 128. The retainer ring 88 attaches to the bonnet 76 in the groove 120. The retainer ring 88 and the locking bonnet nut 128 operate together to block removal of the bonnet nut 126. The locking thumb screw 82 inserts into the aperture 116.

As illustrated, the indicator guide assembly 80 connects to the guide assembly portion 96 of the bonnet 76 with the guide nut 140. Specifically, the guide nut 140 connects to the threaded surface 112 of the bonnet 76 until the guide assembly portion 96 contacts the counter bore 152. When the guide assembly portion 96 contacts the counter bore 152 it blocks further movement of the guide nut 140 creating a space 244 between the guide nut 140 and the body portion 98 of the bonnet 76. The sleeve slot 154 on the guide nut 140 receives the guide sleeve 142, and is held in place with the sleeve nut 146. The guide sleeve 142 then receives the indicator guide 144. The needle connection nut 148 securely connects the indicator guide 144 to the needle 72. With the indicator guide 144 connected to the needle 72 the indicator guide 144 can indicate changes in a position of the needle 72 in the flow control system 12.

As illustrated, the needle 72 passes through the center of the guide 144, guide sleeve 142, guide nut 140, bonnet 76, bonnet nut 126, seal retainer 200 and into the seat 74. Furthermore, threaded second portion 172 of the needle 72 threads into the threaded surface 124 of the bonnet 76. Accordingly, the needle 72 may change its position with respect to the seat 74 by threading it in or out of the bonnet 76.

The manual actuator 240 (e.g., manual hand wheel) includes a wheel 246 and a handle 248. The wheel 246 defines an aperture 250 with an aperture surface 252. This aperture 250 enables the manual actuator 240 to connect to the needle 72. Specifically, the wheel 246 slides over the needle 72 through aperture 250, bringing the interior surface 252 in contact with the actuator contact surface 180. After connecting the surface 252 with the actuator contact surface 180 the nut 184 threads onto the needle 72 securing the manual actuator 240.

As explained above, the flow control system 12 may use a powered actuator 242, instead of the manual actuator 240. The powered actuator 242 may be a hydraulic actuator, electric actuator, pneumatic actuator, among others. The powered actuator 242 attaches to the mounting assembly 42 with a connector assembly 254. Advantageously, the flow control system can swap actuators without stopping mineral extraction operations or otherwise changing the valve position (e.g., the flow of oil or gas through the flow control device 12).

The connector assembly 254 includes an actuator mounting bracket 256, bolts 258, connector 260, bearings 262, and grease fitting 264. The actuator mounting bracket 256 includes a first flange 266 and a second flange 268. The first flange 266 defines a width 270 and an aperture 272. The aperture 272 defining a diameter 274 that is greater than or equal to the diameter 110 of the bonnet guide portion 96 but less than the diameter 114 of the bonnet main body portion 98. The second flange 268 includes a connector counter bore 276, grease aperture 278, and connector aperture 280. The connector 260 includes a needle connector portion 282 and a base portion 284. The connector portion 282 defines an aperture 286 and the base portion 284 includes a flange 288.

In order to mount the connector assembly 254, the indicator guide assembly 80 is removed from the bonnet 72. The mounting bracket 256 then connects to the mounting assembly 42 by sliding the mounting bracket 256 over the bonnet guide portion 96 through the aperture 272 until it contacts the main body portion 98. The indicator guide assembly 80 is then remounted behind the flange 266 of the mounting bracket 256. This securely compresses the flange 266 between the main body portion 98 and the guide 140 in the space 244. The connector 260 may then pass through the aperture 280 in the second flange 268 until the flange 288 contacts the connector counter bore 276. Because the flange 288 is larger than the aperture 280, the base portion 284 cannot pass through the aperture 280, and it therefore remains in contact with the powered actuator 242. Connector portion 282 of the connector 260 receives the needle third portion 174 and contacts the actuator contact surface 180. The nut 184 then secures the connector 260 to the needle 72. Finally the powered actuator 242 connects to the mounting bracket 256 with bolts 258.

Figure 4:
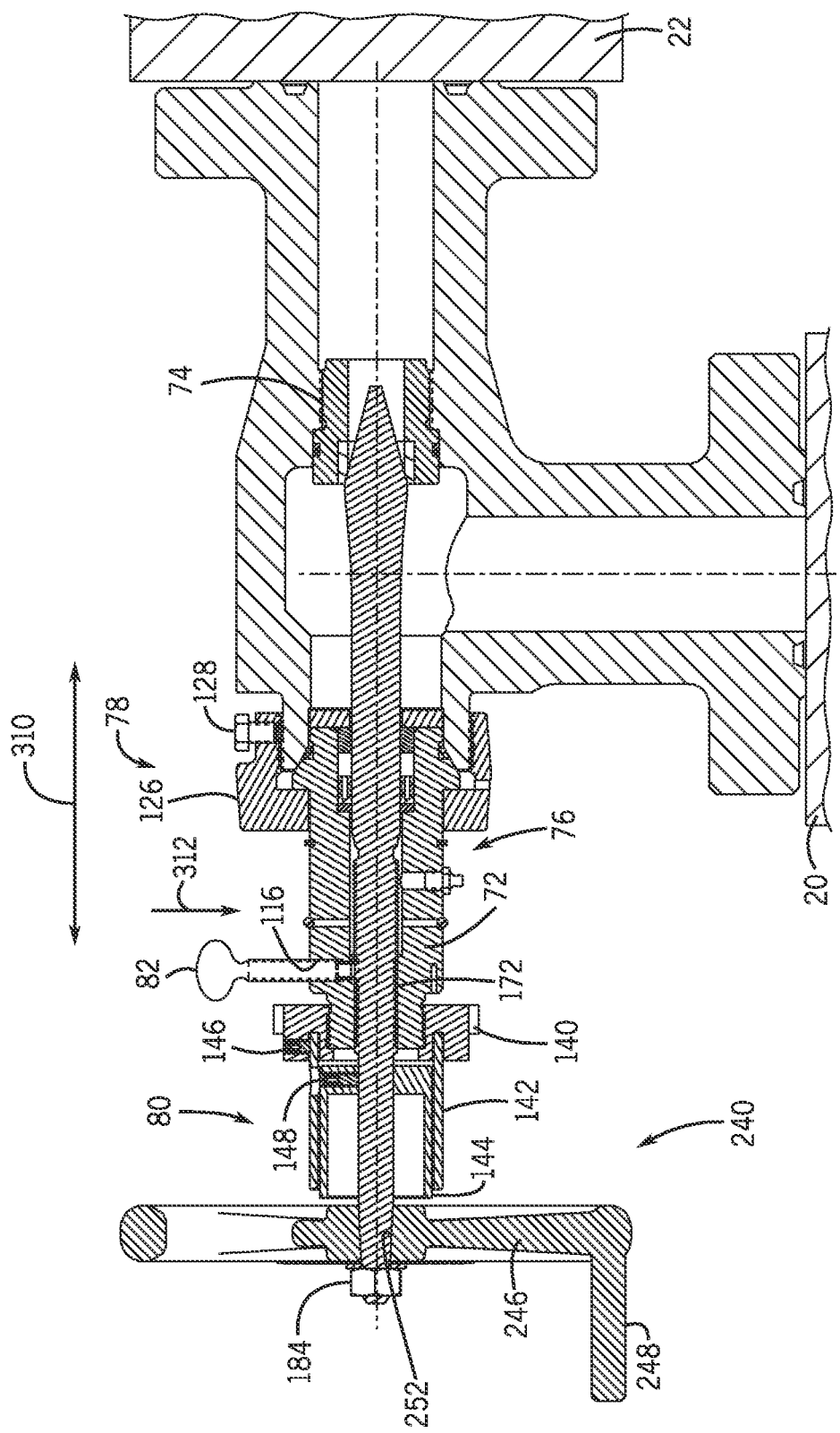
FIG. 4 is a cross-sectional view of the flow control system with the manual actuator.

FIG. 4 is a cross-sectional view of the flow control system 12 with the manual actuator 240. As illustrated, the manual actuator 240 connects to the needle 72 through the aperture 252. The nut 184 secures the manual actuator 240 to the needle 72. An operator may then use the handle 248 to turn the manual actuator 240. As the operator turns the wheel 246, it causes the needle 72 to rotate. The rotation causes the threaded second portion 172 to interact with the threaded surface 124 of the bonnet 76, thereby threading the needle 72 further into or further out of seat 74 in direction 310. The changing distance between the needle 72 and the seat 74 increases or decreases the space between the two. More space increases pressure and mineral flow into the pipe 22, while less space decreases pressure and mineral flow into the pipe 22. As explained above, depending on the stage in the mineral extraction process, it may be desirable to change the type of actuator controlling the flow control device 40. The locking thumb screw 82 may be threaded into the aperture 116, in direction 312, until it contacts and locks the needle 72 in its current position. The manual actuator 240 may then be removed and replaced with a powered actuator 242. This advantageously enables continued mineral extraction operations (e.g., mineral flow from the Christmas tree 20 into the pipe 22) while changing the actuator type, without changing the bonnet 76 or the needle 72.

Figure 5:
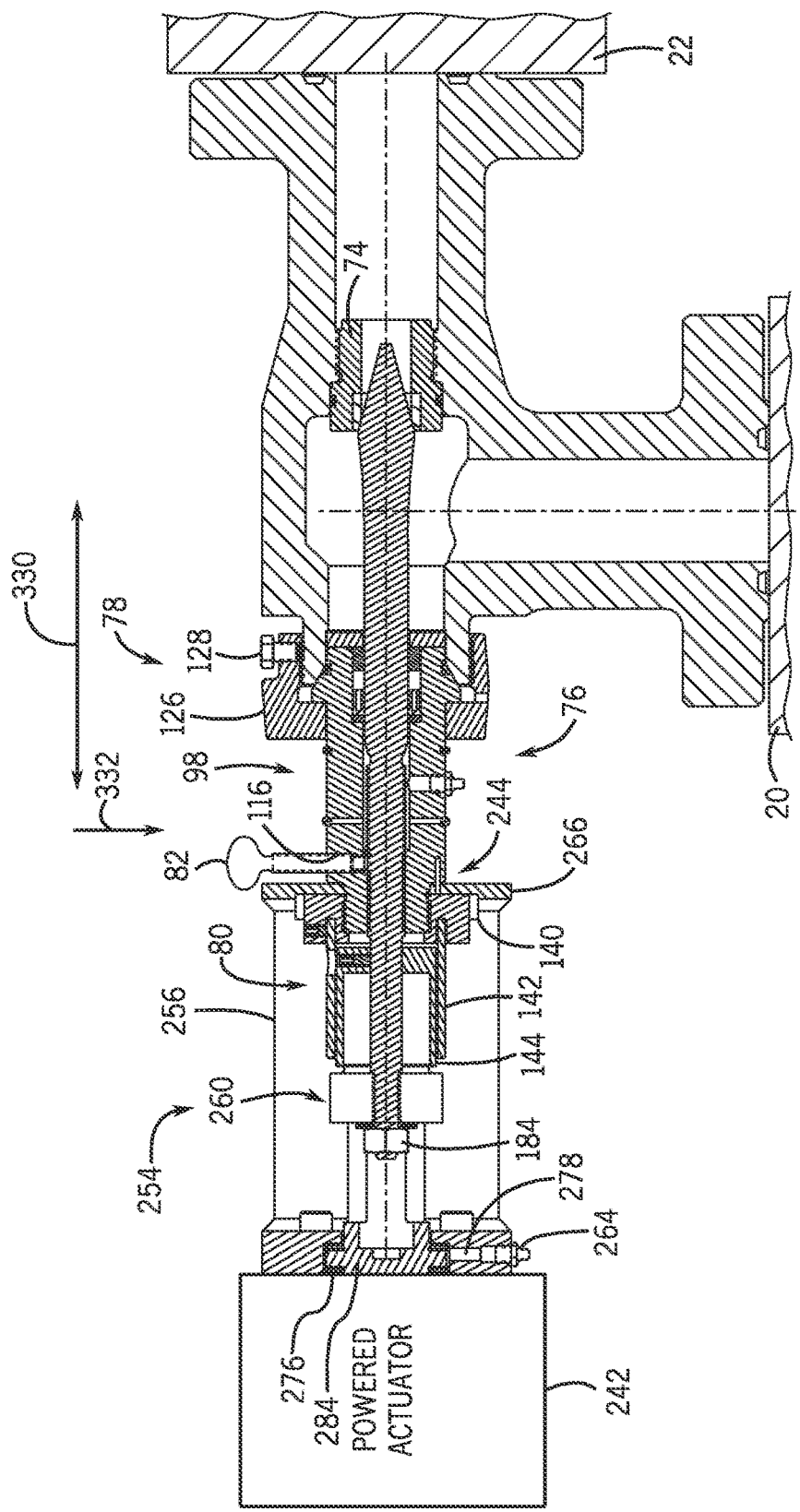
FIG. 5 is a cross-sectional view of the flow control system with the powered actuator.

FIG. 5 is a cross-sectional view of the flow control system 12 with the powered actuator 242. As illustrated, the powered actuator 242 connects to the bonnet 76 with the connector assembly 254. As explained above, the bracket 256 connects to the mounting assembly 42 in the space 244 between the body portion 98 of the bonnet 76 and the guide nut 140. The connector 260 connects to the needle 76 with the first portion 282 and the nut 184. The connector 260 connects to the powered actuator 242 with the second portion 284. This allows the connector 260 to transfer torque from the powered actuator 242 to the needle 76. In use, the powered actuator 242 causes the connector 260 to rotate within the mounting bracket 256. The bearings 262 support the connector base portion 284 as the connector 260 rotates. The bearings 262 reduce friction and may also receive grease as it enters through the grease fitting 264 and passes through the aperture 278. The torque transferred from the connector 260 to the needle 72 causes the threaded second portion 172 to thread further into or further out of seat 74 in direction 330. The changing distance between the needle 72 and the seat 74 increases or decreases the space between the two. More space increases pressure and mineral flow into the pipe 22 while less space decreases pressure and mineral flow into the pipe 22. The embodiment in FIG. 5, like that in FIG. 4, allows the actuator to be swapped out while maintaining operation of the valve (e.g., online). As explained in FIG. 4, the locking thumb screw 82 may be threaded into the aperture 116, in direction 332, until it contacts and locks the needle 72 in its current position. The powered actuator 242 may then be removed and replaced with the manual actuator 240 or with another kind of powered actuator, without changing the bonnet 76 or the needle 72. This advantageously enables mineral extraction operations to continue, while changing the actuator in an event that the actuator breaks or if another kind of actuator is needed.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a flow control system configured to couple to a wellhead system, wherein the flow control system comprises:
a flow control device comprising a housing, with a first flow path fluidly coupled to a second flow path through the housing from an inlet to an outlet, wherein the second flow path is angled with respect to the first flow path;
a flow control element comprising a threaded shaft configured to selectively couple to a manual actuator or a powered actuator, wherein the threaded shaft is configured to rotate along threads to move the flow control element between opened and closed positions, wherein the flow control element is substantially parallel with the first flow path and configured to control a flow of fluid through the housing by moving axially in and out of the first flow path; and
an actuator mounting assembly coupled to the flow control device, wherein the actuator mounting assembly is configured to selectively mount one of the manual actuator and the powered actuator to actuate the flow control element, wherein the actuator mounting assembly comprises a bonnet, a bonnet nut assembly coupling a first end portion of the bonnet to the housing, and an actuator retention assembly coupled to a second end portion of the bonnet, wherein the threaded shaft is configured to be threaded to the bonnet along a shaft bore of the bonnet such that the threaded shaft extends axially through the bonnet, the bonnet nut assembly, and the actuator retention assembly, wherein the actuator retention assembly and the bonnet are configured to selectively capture a mounting bracket of the powered actuator axially between axially opposing surfaces of the actuator retention assembly and the bonnet, wherein the bonnet nut assembly comprises internal threads configured to mate with external threads of the housing to secure the bonnet to the housing via interaction of an internal surface of the bonnet nut assembly and an external surface of a flange of the bonnet, and wherein the bonnet nut assembly comprises a lock screw selectively movable through an aperture of the bonnet against the threaded shaft to block movement of the flow control element during a change between the manual actuator and the powered actuator, wherein the aperture of the bonnet is crosswise to the shaft bore of the bonnet.

2. The system of claim 1, wherein the bonnet and the threaded shaft remain the same when attaching the manual actuator or the powered actuator.

3. The system of claim 1, comprising the manual actuator coupled to the flow control device with the actuator mounting assembly.

4. The system of claim 1, comprising the powered actuator coupled to the flow control device with the actuator mounting assembly.

5. The system of claim 4, wherein the powered actuator is an electric actuator, a hydraulic actuator, a pneumatic actuator, or a combination thereof.

6. The system of claim 1, wherein the actuator retention assembly comprises a guide nut comprising internal threads configured to mate with external threads of the second end portion of the bonnet.

7. The system of claim 6, wherein the actuator retention assembly comprises a guide sleeve, and the guide nut comprises a sleeve slot configured to axially receive the guide sleeve.

8. The system of claim 7, wherein the guide nut comprises a sleeve nut aperture, and the actuator retention assembly comprises a sleeve nut selectively movable through the sleeve nut aperture of the guide nut against the guide sleeve to hold the guide sleeve in place with respect to the guide nut.

9. The system of claim 7, wherein the actuator retention assembly comprises a guide configured to be positioned radially within the guide sleeve, wherein the guide is configured to be securely connected to the flow control element.

10. A flow control system, comprising:
a flow control device comprising a housing and a flow control element comprising a threaded shaft configured to selectively couple the flow control device to a manual actuator or a powered actuator; and
an actuator mounting assembly coupled to the flow control device, wherein the actuator mounting assembly is configured to selectively mount one of the manual actuator and the powered actuator to actuate the flow control element, wherein the actuator mounting assembly comprises a bonnet, a bonnet nut assembly coupling a first end portion of the bonnet to the housing, and an actuator retention assembly coupled to a second end portion of the bonnet, wherein the threaded shaft is configured to be threaded to the bonnet along a shaft bore of the bonnet such that the threaded shaft extends axially through the bonnet, the bonnet nut assembly, and the actuator retention assembly, wherein the actuator retention assembly and the bonnet are configured to selectively capture a mounting bracket of the powered actuator axially between axially opposing surfaces of the actuator retention assembly and the bonnet, wherein the bonnet nut assembly comprises internal threads configured to mate with external threads of the housing to secure the bonnet to the housing via interaction of an internal surface of the bonnet nut assembly and an external surface of a flange of the bonnet, and wherein the bonnet nut assembly comprises a lock screw selectively movable through an aperture of the bonnet against the threaded shaft to block movement of the flow control element during a change between the manual actuator and the powered actuator, wherein the aperture of the bonnet is crosswise to the shaft bore of the bonnet.

11. The flow control system of claim 10, wherein the flow control device comprises a first flow path fluidly coupled to a second flow path through the housing from an inlet to an outlet, wherein the second flow path is angled with respect to the first flow path.

12. The flow control system of claim 11, wherein the flow control element is substantially parallel with the first flow path and configured to control a flow of fluid through the housing by moving axially in and out of the first flow path.

13. The flow control system of claim 10, wherein the threaded shaft is configured to rotate along threads to move the flow control element between opened and closed positions.

14. The flow control system of claim 10, wherein the bonnet and threaded shaft remain the same when attaching the manual actuator or the powered actuator.

15. The flow control system of claim 10, comprising the manual actuator coupled to the flow control device with the actuator mounting assembly.

16. The flow control system of claim 10, comprising the powered actuator coupled to the flow control device with the actuator mounting assembly.

17. The flow control system of claim 16, wherein the powered actuator is an electric actuator, a hydraulic actuator, a pneumatic actuator, or a combination thereof.

18. The flow control system of claim 10, wherein the actuator retention assembly comprises a guide nut comprising internal threads configured to mate with external threads of the second end portion of the bonnet, the actuator retention assembly comprises a guide sleeve, and the guide nut comprises a sleeve slot configured to axially receive the guide sleeve.

19. The flow control system of claim 18, wherein the guide nut comprises a sleeve nut aperture, and the actuator retention assembly comprises a sleeve nut selectively movable through the sleeve nut aperture of the guide nut against the guide sleeve to hold the guide sleeve in place with respect to the guide nut.

20. The flow control system of claim 19, wherein the actuator retention assembly comprises a guide configured to be positioned radially within the guide sleeve, wherein the guide is configured to be securely connected to the flow control element.

* * * * *